Jan. 19, 1943.  S. JENCICK  2,308,881

FLEXIBLE COUPLING

Filed July 3, 1941

INVENTOR
Stephen Jencick
BY Milburn Milburn
ATTORNEYS.

Patented Jan. 19, 1943

2,308,881

UNITED STATES PATENT OFFICE 2,308,881

FLEXIBLE COUPLING

Stephen Jencick, Chagrin Falls, Ohio

Application July 3, 1941, Serial No. 401,036

11 Claims. (Cl. 64—12)

This invention relates to the art of flexible couplings for universal connections in shaft assemblies.

There have already been devised, of course, various forms of universal couplings of the type embodying a single flexible disk of rubberized fabric; in fact, I devised such a coupling of this type and of smaller size many years ago. But the employment of a continuous single form of flexible disk in a coupling designed for heavy duty would be prohibitive because of its size and hence its cost.

Therefore it is the object of the present invention to devise a form of flexible coupling that is adapted for heavy duty without being prohibitive in cost.

Briefly, the object of this invention is to devise a universal coupling in which a plurality of flexible elements are arranged at intervals in a substantially circumferential manner instead of a continuous form of flexible disk, with the view of producing a heavy duty coupling at reasonable cost.

Another object is to devise a universal coupling in which there is embodied a combination of rubberized fabric, throughout the main part of the flexible disk, and intermediate elements of pure rubber or the like at the points of connection between the disk and the connector elements, so as to thereby relieve the fabric from considerable torsional strain which is absorbed by compression of the pure rubber and also to compensate for any tendency of the fabric to become "set" over a prolonged period of time.

Other objects will appear from the following description and claims when considered together with the accompanying drawing.

It is to be understood that the present form of disclosure is merely for the purpose of illustration and that there might be devised various modifications without departing from the spirit of the present invention as herein set forth and claimed.

In carrying out my present form of invention, any number of flexible units may be employed in any given installation and they may be located in any particular manner about the axis of the shaft, either in a single circumferential arrangement or in a multiple concentric arrangement about the axis of the shaft. In the present illustration, I have shown six such flexible units, all of which are exact duplicates.

It is to be understood that my installation includes the companion duplicate shaft connectors 1 and 2 which are affixed to the drive and driven shafts, respectively. In the present form of disclosure, the connectors are provided with the annular radially extending flanges 3 and 4 which occupy parallel spaced relation to each other. Between these flanges I have provided my flexible coupling units at spaced intervals thereabout.

Figure 1:
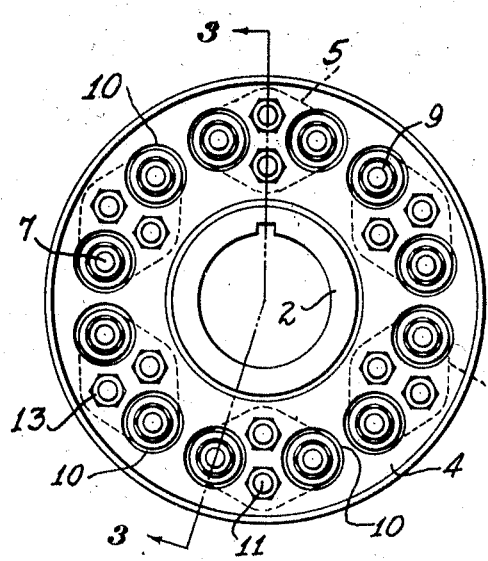
Fig. 1 is an elevation of one side of my present form of coupling.
Figure 2:
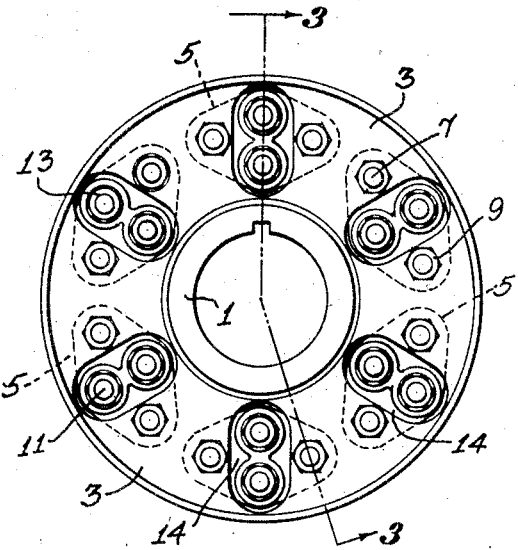
Fig. 2 is an elevation of the other side of my present form of coupling.
Figure 3:
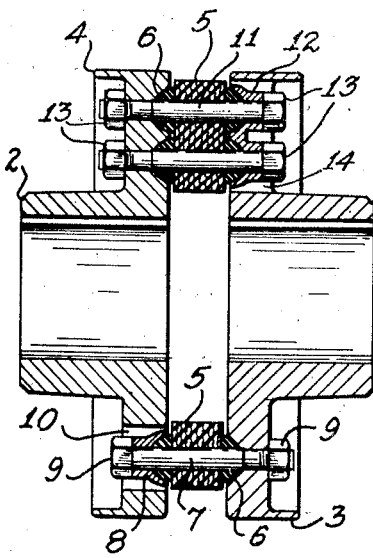
Fig. 3 is a view taken on line 3—3 of Fig. 1 or on line 3—3 of Fig. 2.
Figure 4:
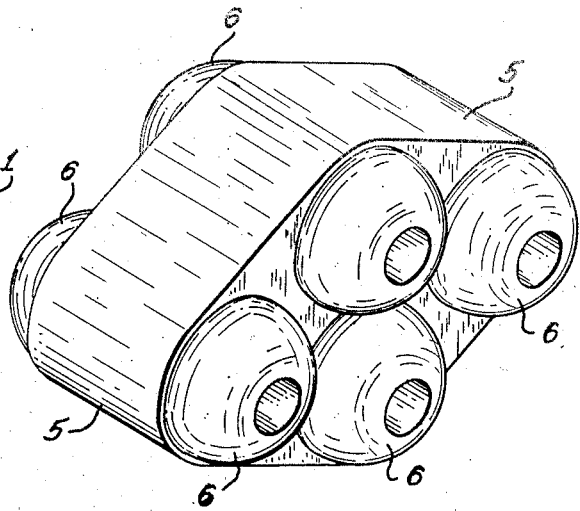
Fig. 4 is a perspective view of the flexible unit comprising the combination of a rubberized fabric disk and rubber knobs.

The rubberized fabric disk element 5 is, in each instance, of approximately diamond or cantilever shape and is arranged with its length extending in a direction circumferentially about the assembly, as indicated in Figs. 1 and 2 of the drawing. Each link 5 is provided with bolt holes at the four corners thereof, and vulcanized to each of these disks are the knobs 6 of pure rubber at the points of the bolt connections, these knobs being of approximately semi-spherical shape. That is, these knobs surround the bolt holes through the link or disk 5 and are engaged by the correspondingly spherically formed surfaces of the clamping members, as will be explained.

The bolts 7 at the ends of link 5, in each instance, extend through the flange 3, and the semi-spherical knobs 6 are engaged in the correspondingly formed recess within the inner face of the same flange; while the rubber knobs immediately opposite are engaged by the correspondingly shaped surfaces of the members 8 which are held in clamped engagement therewith by the nuts 9 upon the ends of the bolts, these bolt connections being otherwise free and floating at their ends remote from the flange 3 by virtue of the individual openings 10 which are provided at these points in the flange 4 and through which these bolt connections extend.

At the two side corners of the link 5, in each instance, the bolts 11 extend through the flange 4 and the rubber knobs 6 on that face of the link 5, these knobs being received within correspondingly formed recesses provided in the inner face of the flange 4 so as to have clamping engagement therewith. These bolts, at their outer ends, are provided with the members 12 which have spherical surfaces for effective clamping engagement with the knobs 6 upon that face of the link 5, these members being held in such clamping engagement by the nuts 13 upon the bolts 11, and these ends of the bolts being otherwise free and floating by virtue of the oval-shaped opening 14 which is provided in the flange 3 at this point and into which the bolts and companion members extend.

Thus the bolts at the two ends of the link 5, in each instance, are fixed to the flange 3 and are freely floating at their other ends in the region of the flange 4; while the bolts at the two sides of the link are fixed to the flange 4 and are freely floating at their other ends in the region of the flange 3. As a result, the flexible unit in each instance provides the only means of connection between the flange 3 and the flange 4 and this is true throughout the entire extent of the flanges 3 and 4. Therefore, there are provided a plurality of circumferentially spaced universal flexible connections between the drive and driven members and they are so constructed as to allow for both direct and angular misalignment. These connections require no lubrication or other attention after having been once installed.

It is to be observed that the recesses in the inner faces of the flanges 3 and 4 and the companion members upon the opposite sides of the links 5 are of such depth that they will not receive the rubber knobs 6 entirely, and consequently these clamping means do not engage the flexible link 5 when in clamped engagement. This is for the purpose of permitting the rubber of the knobs 6 to be expanded radially over the face of the link 5 upon effecting sufficient clamping engagement of the clamping members at any time, as for instance when the rubber knobs 6 take up the torsional strain upon the disk by being placed under compression in any direction according to the direction of the strain to which the link 5 is subjected at any given time.

Thus the rubber knobs 6 relieve the fabric link 5 of a great deal of strain, to which they would otherwise be subjected, and moreover the rubber knobs serve to compensate for the tendency of the fabric link to become "set" after a period of time, the rubber being adapted to either store up or release pressure as the conditions may require at any given time. Thus there is realized the advantage of the strength of the rubberized fabric without any objectionable stiffness that would normally be due to the very nature of the fabric, this advantage being made possible by virtue of the compensating effect of the pure rubber of the knobs 6, as explained. This co-operative combination of strength and resilience is most efficient in such an assembly and is hence most desirable in various heavy-duty installations.

With this assembly of circumferentially spaced units, I have found that there will be realized a saving of approximately one-half of the cost of the rubberized fabric as compared with a device of the same size in which a continuous disk of rubberized fabric is employed. Thus my present form of assembly can be adopted in the larger installations in which the use of a continuous disk of rubberized fabric would be prohibitive; and this combination can be employed to advantage in any and all sizes of installations except in the smaller sizes where it is more practical to employ the single or continuous form of disk of rubberized fabric. However, this same combination of rubberized fabric disk and pure rubber knobs can be employed in the single continuous disk form of unit for smaller sizes, if so desired, and with the same resultant advantages as above described for such a unit. The point is that, in the present form of disclosure, I now make possible in the larger installations of heavy duty, without limitation as to size, the employment of the same general principle of flexible coupling as has heretofore been possible only in the smaller types of installation as above referred to. For instance, my present combination can be employed with a very marked advantage in connection with Diesel engines with the result that the vibration harmonics are smoothed out into a regular sine curve.

Although the present form of disclosure shows the continuous flanges 3 and 4, yet it is to be understood that there may be provided the spider type of connections at these points with spaced arms extending radially to the several flexible connection units, thereby eliminating the intermediate metal of the flanges and increasing even still further the flexibility of the complete assembly.

What I claim is:

1. A coupling combination comprising a pair of companion members adapted for connection to drive and driven shafts, respectively, each of said members having radially extending flange means with confronting faces, and a plurality of individual flexible couplings spaced from each other about the longitudinal axis of the assembly and arranged between said confronting faces and each having spaced pairs of opposite points connected to said flange means of said companion members so as to constitute a flexible floating, universal drive connection therebetween.

2. A coupling combination comprising a pair of companion members adapted for connection to drive and driven shafts, respectively, each of said members having radially extending flange means with confronting faces, and a plurality of individual flexible couplings spaced from each other about the longitudinal axis of the assembly and arranged between said confronting faces and connected to said flange means of said companion members so as to constitute a flexible drive connection therebetween, each of said flexible couplings including a flat flexible link of rubberized fabric and universally resilient connections of rubber at spaced pairs of opposite points between said link and said flange means.

3. A coupling combination comprising a pair of companion members adapted for connection to drive and driven shafts, respectively, each of said members having radially extending flange means with confronting faces, and a plurality of individual flexible couplings spaced about the longitudinal axis of the assembly and arranged between said confronting faces and connected to said flange means of said companion members so as to constitute a flexible drive connection therebetween, each of said flexible couplings including a substantialy diamond-shaped flat link of flexible material arranged with its length extending substantially circumferentially of the axis of the assembly, and including also universally resilient connections between the four corners of said link and said flange means.

4. A coupling combination comprising a pair of companion members adapted for connection to drive and driven shafts, respectively, each of said members having radially extending flange means with confronting faces, and a plurality of individual flexible couplings spaced about the longitudinal axis of the assembly and arranged between said confronting faces and connected to said flange means of said companion members so as to constitute a flexible drive connection therebetween, each of said flexible couplings including a substantially diamond-shaped flat link of flexible material arranged with its length extending substantially circumferentially of the axis of the assembly, and including also universally resilient connections between alternate corners of said link and said two flange means, respectively.

5. A coupling combination comprising a pair of companion members adapted for connection to drive and driven shafts, respectively, each of said members having radially extending flange means with confronting faces, and a plurality of individual flexible couplings spaced about the longitudinal axis of the assembly and arranged between said confronting faces and connected to said flange means of said companion members so as to constitute a flexible drive connection therebetween, each of said flexible couplings including a substantially diamond-shape flat link of flexible material arranged with its length extending substantially circumferentially of the coupling, and including also bolts through the four corners of said link, universally resilient connections between one pair of opposite bolts and the flange means on one of said companion members, and universally resilient connections between the other pair of opposite bolts and the flange means on the other of said companion members, said flange means being open at the other ends of each pair of said bolts as to afford floating, flexible universal connection between said oppositely disposed flange means.

6. A coupling combination comprising a pair of companion members adapted for connection to drive and driven shafts, respectively, each of said members having radially extending flange means with confronting faces, and a plurality of individual flexible couplings spaced about the longitudinal axis of the assembly and arranged between said confronting faces and connected to said flange means of said companion members so as to constitute a flexible drive connection therebetween, each of said flexible couplings including a substantially diamond-shaped flat link of rubberized fabric arranged with its length extending substantially circumferentially of the coupling, and including also bolts through the four corners of said link, universally resilient rubber connections between one pair of opposite bolts and the flange means on one of said companion members, and universally resilient rubber connections between the other pair of opposite bolts and the flange means on the other of said companion members, universally resilient rubber connections between the other ends of said pairs of bolts and the opposite faces of said link, and said flange means being open at said other ends of each pair of said bolts so as to afford floating flexible universal connection between said oppositely disposed flange means.

7. In a universal coupling, a pair of companion members adapted for connection to drive and driven shafts, respectively, each of said members having radially extending, oppositely disposed flange means, an annular series of spaced substantially flat bodies of rubberized fabric arranged between said flange means, a plurality of sets of bolts having universally resilient rubber connections between one of said flange means and opposite parts of said bodies, and a plurality of other sets of bolts having staggered relation to those of said first sets and having universally resilient rubber connections between the other of said flange means and opposite parts of said bodies, thereby providing a universally floating connection between said flange means.

8. In a universal coupling, a pair of companion members adapted for connection to drive and driven shafts, respectively, each of said members having radially extending, oppositely disposed flange means, an annular series of spaced unitary substantially flat bodies of rubberized fabric arranged between said flange means and each having as part thereof substantially semispherical oppositely disposed rubber knobs at sets of points about the marginal portion thereof, a plurality of sets of bolt clamps extending through and having clamping engagement with one set of knobs, in each case, and thereby connecting said body to one of said flange means, and a plurality of other sets of bolt clamps extending through and having clamping engagement with the other set of knobs, in each case, and thereby connecting said body to the other of said flange means, the bolts of one set being staggered with respect to those of the other set, in each case, thereby producing a universally resilient coupling.

9. In a flexible coupling, a unitary substantially flat body of rubberized fabric having sets of bolt holes therethrough, substantially semispherical resilient knobs of substantially plain rubber or the like affixed to opposite faces of said body and surrounding said bolt holes as permanent and unitary parts of said body.

10. In a flexible coupling, a substantially diamond-shaped, unitary link of rubberized fabric having bolt holes therethrough at the four corners thereof, and substantially semispherical knobs of substantially plain rubber or the like affixed to opposite faces of said link and surrounding said bolt holes as permanent and unitary parts of said link.

11. A coupling combination comprising a pair of companion members adapted for connection to drive and driven shafts, respectively, each of said members having substantially radially extending connecting means with confronting faces, and a plurality of separate universally flexible connecting elements arranged circumferentially about the longitudinal axis of the assembly in spaced relation to each other between and connected to the confronting faces of said companion members, the interengaging surfaces between said flexible elements and said companion members being of substantially semispherical form.

STEPHEN JENCICK.